United States Patent Office 3,397,213
Patented Aug. 13, 1968

3,397,213
12 METHYL-9,11-DIHALOPROGESTERONES
Patrick A. Diassi, Westfield, N.J., assignor to E. R. Squibb & Sons, Inc., New York, N.Y., a corporation of Delaware
No Drawing. Filed Jan. 12, 1966, Ser. No. 520,050
3 Claims. (Cl. 260—397.3)

ABSTRACT OF THE DISCLOSURE

The instant disclosure relates to 9,11-dihalo-12α-methyl steroids and derivatives thereof. These compounds possess progestational activity and hence can be utilized in lieu of known progestational agents.

This invention relates to and has for its objects the provision of new physiologically active steroids, methods for preparing the same, and intermediates useful in such preparation.

The final products of this invention can be represented by the formula

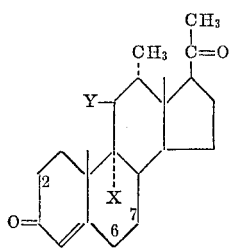

wherein X is a halogen having an atomic weight greater than 19; Y is a halogen having an atom weight less than 126 and being at least as electronegative as X; and the 1,2- and 6,7-positions are saturated or double bonded.

The final products of this invention are physiologically active substances which possess progestational activity and hence can be used in lieu of known progestational agents, such as progesterone, in the treatment of habitual abortion. For this purpose they can be administered in the same manner as progesterone, for example, the dosage being adjusted for the relative potency of the particular steroid. The compounds of this invention can also be administered perorally in the form of tablets.

In addition, compounds of this invention possess antiinflammatory activity.

The final products of the invention are prepared by utilizing 12α-methylpregna-4,9(11)-diene-3,20-dione as the starting material. It has been found that this starting material may be halogenated since heretofore it was believed that the methyl group in the 12-position would hinder the 11-position to yield a novel 9α,11β-dihalo-12α-methylprogesterone compound of this invention. The novel compounds are prepared by reacting the starting materials with a suitable halogenating agent, e.g., iodine monochloride, chlorine, bromine, fluorine, pyridinium bromide perbromide, pyridinium chloride perchloride, iodobenzene dichloride, dimethyl-N,N-dibromohydantoin, N-isodosuccinimide, and mixtures of N-haloamide and halide such as N-chlorosuccinamide and hydrogen chloride, N-bromoacetamide and hydrogen bromide, N-bromoacetamide and lithium chloride; N-bromoacetamide and hydrogen fluoride, N-iodosuccinimide and sodium chloride.

The process is generally carried out in the presence of a nonreacting solvent known in the art at temperatures ranging from 5° C. to 50° C. with reaction times ranging from one-half to twenty-four hours, depending on the reagents involved.

The 9α,11β-dihalo-12α-methylprogesterone compound of this invention may be treated to form the Δ¹,⁴-diene, Δ⁴,⁶-diene, and Δ¹,⁴,⁶-triene compounds of the invention.

For example, if a Δ¹-derivative is desired the resulting 9α,11β-dihalo-12α-methylprogesterone is treated with 2,3-dichloro-5,6-dicyanobenzoquinone, preferably at an elevated temperature, such as reflux temperatures of the solvent used to dissolve the steroid, to yield the corresponding 1-dehydro derivatives of the starting steroid. The Δ⁴,⁶-derivative may be prepared by treating the resulting 9α,11β-dihalo-12α-methylprogesterone compound with a one molar equivalent of 2,3-dichloro-5,6-dicyano-1,4-benzoquinone, in the presence of a catalytic amount of an acid and in an inert solvent. The Δ⁴,⁶-derivative may be converted into the corresponding Δ¹,⁴,⁶-triene by further treatment with 2,3-dichloro-5,6-dicyano-1,4-benzoquinone under the conditions specified hereinbefore for the production of the Δ¹,⁴-derivatives. These reactions may be carried out on the 9α,11β-dihalo-12α-methylprogesterone compounds of the invention regardless of whether the halo radicals are the same or different.

In the above compounds the halogen at C–11 must be at least as electronegative as the halogen present in the 9α-position (fluorine being the most electronegative halogen, and iodine the least electronegative) and further cannot be iodo. Thus a 12α-methylprogesterone of our invention containing a 9α-chloro group may possess an 11β-chloro or an 11β-fluoro group, but cannot contain an 11β-iodo or 11β-bromo group. This artificial restriction as to the electronegativity of the 9 and 11 substituents is necessarily imposed in view of the configuration of the compound.

The following examples are illustrative of this invention. All temperatures are in degrees centigrade unless otherwise set forth:

Example 1.—9α,11β-dichloro-12α-methylprogesterone (a) To a solution of 200 mg. of 12α-methylpregna-4,9(11)-diene-3,20-dione in 20 ml. of dioxane and 2 ml. of water 85 mg. of 6,6-dichlorodimethylhydantoin are added followed by 2 ml. of 1 N perchloric acid and the mixture left at room temperature for two and one-half hours. Excess N,N-dichlorodimethylhydantoin is then destroyed by the addition of dilute aqueous sodium sulfite. The solution is neutralized with 5% sodium bicarbonate diluted with water and extracted with chloroform. The chloroform phase is separated, washed with water and evaporated under reduced pressure. Crystallization of the residue gives 9α,11β - dichloro - 12α - methylprogesterone having a melting point about 220–222°, [α]_D +205° (chloroform), $\lambda_{max.}^{alc.}$ 238 mμ (ε 18,000), $\lambda_{CDCl_3}^{Si(Me)_4}$ 8.90 (s, 18–CH₃), 8.63 (d, $J=y$ .5 c.p.s., 12α–CH₃), 8.25 (s, 19–CH₃), 7.90 (s, 21–CH₃), 7.24 (s, 12β–H), 5.42 (s, 11α–H), 4.29 (s, 4–H)

Analysis.—Calc'd for $C_{22}H_{30}O_2Cl_2$ (397.36): C, 66.49; H, 7.61; Cl, 17.85. Found: C, 66.85; H, 7.67; Cl, 16.59.

(b) To a stirred solution of 326 mg. of 12α-methylpregna-4,9(11)-diene-3,20-dione in 10 ml. of glacial acetic acid cooled to 0° C. 1.0 g. of lithium chloride is added followed by 140 mg. of N-chlorosuccinimide, and an anhydrous solution of hydrogen chloride (20 mg.) in 1 ml. of tetrahydrofuran. After one hour the reaction mixture is poured into cold water and filtered to give 9α,11β-dichloro-12α-methylprogesterone.

Example 2.—9α,11β-dichloro-12α-methylpregna-4,6-diene-3,20-dione

To a solution of 400 mg. of 9α,11β-dichloro-12α-methylprogesterone and 30 mg. of 2,3-dichloro-5,6-dicyanobenzoquinone in 15 ml. of dioxane hydrogen chloride is bubbled for one minute and the solution left at room temperature for sixteen hours. It is then diluted with 15 ml. of chloroform filtered and the filtrate passed through 7 g. of alumina (Activity V). The alumina is washed with chloroform and the filtrate evaporated and crystallized to give 9α,11β - dichloro-12α-methylpregna-4,6-diene-3,20-dione.

Example 3.—9α,11β-dichloro-12α-methylpregna-1,4-diene-3,20-dione

A solution of 400 mg. of 9α,11β-dichloro-12α-methylprogesterone and 300 mg. of 2,3-dichloro-5,6-dicyanobenzoquinone in 15 ml. of dioxane is refluxed under nitrogen for five hours. It is then cooled, filtered and washed with 20 ml. of chloroform. The combined filtrate and washings are adsorbed into 10 g. of alumina (Activity V) and washed with chloroform. The filtrate is evaporated to dryness and crystallized to give 9α,11β-dichloro-12α-methylpregna-1,4-diene-3,20-dione.

Example 4.—9α,11β-dichloro-12α-methylpregna-1,4,6-triene-3,20-dione

Following the procedure of Example 3, but substituting 9α,11β-dichloro-12α-methylpregna-4,6-diene-3,20 - dione for the 9α,11β-dichloro-12α-methylprogesterone there is obtained 9α,11β-dichloro-12α-methylpregna-1,4,6-triene-3,20-dione.

Example 5.—9α-bromo-11β-chloro-12α-methylprogesterone

Following the procedure of Example 1(b) but substituting an equivalent amount of N-bromoacetamide for the N - chlorosuccinimide there is obtained 9α - bromo-11β-chloro-12α-methylprogesterone.

Example 6.—9α-chloro-11β-fluoro-12α-methylprogesterone

To a stirred solution of 1 g. of 12α-methylpregna-4,9(11)-diene-3,20-dione and 900 mg. of N-chlorosuccinimide in 30 ml. of carbon tetrachloride and 4 ml. of pyridine are added 1.5 ml. of a solution containing 588 mg. of hydrogen fluoride in chloroformtetrahydrofuran (3:1, v.:v.). After twenty hours the reaction mixture is poured into 10% sodium carbonate and extracted with methylene chloride. The methylene chloride is washed with dilute hydrochloric acid then water and evaporated under reduced pressure. Crystallization of the residue gives 9α-chloro-11β-fluoro-12α-methylprogesterone.

Example 7.—9α-bromo-11β-fluoro-12α-methylprogesterone

Following the procedure for Example 6 but substituting N-bromoacetamide for the N-chlorosuccinimide and diethylacetic acid for the carbon tetrachloride and pyridine there is obtained 9α - bromo-11β-fluoro-12α - methylprogesterone.

Example 8

By following the procedures of Examples 2, 3, and 4 but substituting the products of Examples 5, 6 and 7, the corresponding 6-dehydro, 1-dehydro and 1,6-tetradehydro compounds are obtained.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound having the structural formula

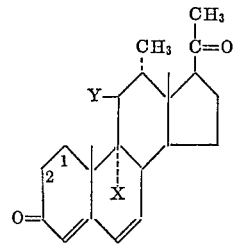

wherein X and Y are halogen; and the 1,2-position is saturated or double bonded.

2. A compound in accordance with the formula of claim 1 wherein X and Y are chloro; 1,2 is saturated; having the name 9α,11β - dichloro-12α-methylpregna-4,6-diene-3,20-dione.

3. A compound in accordance with the formula of claim 1 wherein X and Y are chloro; 1,2 is unsaturated having the name 9α,11β-dichloro-12α-methylpregna-1,4,6-triene-3,20-dione.

References Cited

FOREIGN PATENTS 928,301    6/1963    Great Britain.

ELBERT L. ROBERTS, *Primary Examiner.*